(12) United States Patent
Wang

(10) Patent No.: US 10,050,830 B2
(45) Date of Patent: Aug. 14, 2018

(54) WORK MODE NEGOTIATION

(71) Applicant: Hangzhou H3C Technologies Co., Ltd., Hangzhou (CN)

(72) Inventor: Minghui Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1 day.

(21) Appl. No.: 14/899,890

(22) PCT Filed: Sep. 2, 2014

(86) PCT No.: PCT/CN2014/085770
§ 371 (c)(1),
(2) Date: Dec. 18, 2015

(87) PCT Pub. No.: WO2015/032309
PCT Pub. Date: Mar. 12, 2015

(65) Prior Publication Data
US 2016/0191311 A1 Jun. 30, 2016

(30) Foreign Application Priority Data
Sep. 4, 2013 (CN) .......................... 2013 1 0398619

(51) Int. Cl.
*H04L 12/28* (2006.01)
*H04L 12/24* (2006.01)
(Continued)

(52) U.S. Cl.
CPC ...... *H04L 41/0813* (2013.01); *G06F 9/45558* (2013.01); *H04L 41/0889* (2013.01);
(Continued)

(58) Field of Classification Search
None
See application file for complete search history.

(56) References Cited

U.S. PATENT DOCUMENTS 7,706,363 B1 * 4/2010 Daniel ............... H04L 12/4625
370/389
7,974,272 B2 7/2011 Chang et al.
(Continued)

FOREIGN PATENT DOCUMENTS

CN 1728688 2/2006
CN 101350823 1/2009
(Continued)

OTHER PUBLICATIONS

"How to Set Up Cisco Nexus Fabric Extender", Cisco Systems, Banks, E., Network Computing, Jan. 28, 2013.
(Continued)

*Primary Examiner* — Lonnie V Sweet
(74) *Attorney, Agent, or Firm* — Brooks, Cameron & Huebsch, PLLC

(57) ABSTRACT

A work mode negotiation method is disclosed. A core backbone (CB) device transmits a Mode Negotiate Request packet through an Ethernet port to a port extender (PE) device, wherein the Mode Negotiate Request packet carries a set of identifications of the PE devices for cascade. Next, the CB device receives a Mode Negotiate Reply packet through the Ethernet port sent by the PE device, and transmits a Mode Negotiate Acknowledge packet through the Ethernet port to the PE device. Finally, the CB device changes a current work mode of the Ethernet port from an Ethernet mode to a cascade mode after transmitting the Mode Negotiate Acknowledge packet.

20 Claims, 7 Drawing Sheets

(51) Int. Cl.
  *H04L 12/701* (2013.01)
  *H04L 12/751* (2013.01)
  *H04L 12/713* (2013.01)
  *G06F 9/455* (2018.01)
(52) U.S. Cl.
  CPC ............ *H04L 45/02* (2013.01); *H04L 45/586* (2013.01); *G06F 2009/45595* (2013.01)

(56) References Cited

U.S. PATENT DOCUMENTS

| | | | |
|---|---|---|---|
| 8,249,069 | B2 | 8/2012 | Raman et al. |
| 2004/0060069 | A1* | 3/2004 | Abramson ......... H04N 7/17309 725/110 |
| 2008/0130671 | A1 | 6/2008 | Okamoto |
| 2008/0219477 | A1* | 9/2008 | Aiso ...................... H04B 1/205 381/119 |
| 2009/0168654 | A1 | 7/2009 | Mies et al. |
| 2009/0262643 | A1* | 10/2009 | Zhao ..................... H04L 12/423 370/217 |
| 2012/0127998 | A1* | 5/2012 | Assarpour ............ H04L 49/351 370/392 |
| 2012/0307828 | A1 | 12/2012 | Agarwal et al. |
| 2013/0051384 | A1 | 2/2013 | Eigendy et al. |
| 2013/0176893 | A1* | 7/2013 | Caffrey ................ H04L 12/462 370/254 |

FOREIGN PATENT DOCUMENTS

| | | |
|---|---|---|
| CN | 101483500 | 7/2009 |
| CN | 101599906 | 12/2009 |
| CN | 102215067 | 10/2011 |
| EP | 1727318 B1 | 11/2006 |
| EP | 2533472 | 12/2012 |
| EP | 2696538 | 2/2014 |
| WO | WO-2014067470 | 5/2014 |

OTHER PUBLICATIONS

"Understanding Cisco Nexus 2000 Series Fabric Extenders", Humair Ahmed.com, Aug. 13, 2013.
"Virtual Bridged Local Area Networks—Bridge Port Extension", IEEE Std 802.1BRtm-2012, Jul. 16, 2012, see chapters 6 and 9.
International Search Report and Written Opinion dated Dec. 12, 2014, PCT Patent Application No. PCT/CN2014/085770 dated Sep. 2, 2014 (ISA/CN).
Unknown, "Draft Standard for Local and Metropolitan Area Networks—Virtual Bridged Local Area Networks—Bridge Port Extension", IEEEP802.1BR/D3.3, Institute of Electrical and Electronics Engineers. Inc., Feb. 20, 2012, 146 pages., NY, USA.

* cited by examiner

| DMAC | SMAC | VLAN | Frame Type | Version | Message Type | DATA |

WORK MODE NEGOTIATION

CLAIM FOR PRIORITY

The present application is a national stage filing under 35 U.S.C. § 371 of PCT application number PCT/CN2014/085770, having an international filing date of Sep. 2, 2014, which claims priority to Chinese patent application number 201310398619.8, having a filing date of Sep. 4, 2013, the disclosures of which are hereby incorporated by reference in their entireties.

BACKGROUND

In order to meet the needs of high-density host access of a data center, a vertical virtualization technology becomes more popular. A stacking system built by the vertical virtualization technology typically includes a core backbone (CB) device and a port extender (PE) device. In a stacking system, each PE device is connected to a CB device. From the point view of logical level, a PE device can be understood as a remote line card of a CB device. A CB device is connected to a plurality of PE devices, and each PE device may provide a plurality of access ports, so that the entire the stacking system may provide more access ports, and have good scalability.

BRIEF DESCRIPTION OF DRAWINGS

Features of the present disclosure are illustrated by way of an example and not limited in the following figure(s), in which like numerals indicate like elements, in which.

DETAILED DESCRIPTION

For simplicity and illustrative purposes, a disclosure is described by referring mainly to an example thereof. In the following description, numerous specific details are set forth in order to provide a thorough understanding of the disclosure of the application. It will be readily apparent however, that the disclosure may be practiced without limitation to these specific details. In other instances, some methods and structures have not been described in detail so as not to unnecessarily obscure the disclosure. As used herein, the terms "a" and "an" are intended to denote at least one of a particular element, the term "includes" means includes but not limited to, the term "including" means including but not limited to, and the term "based on" means based at least in part on.

Figure 1:
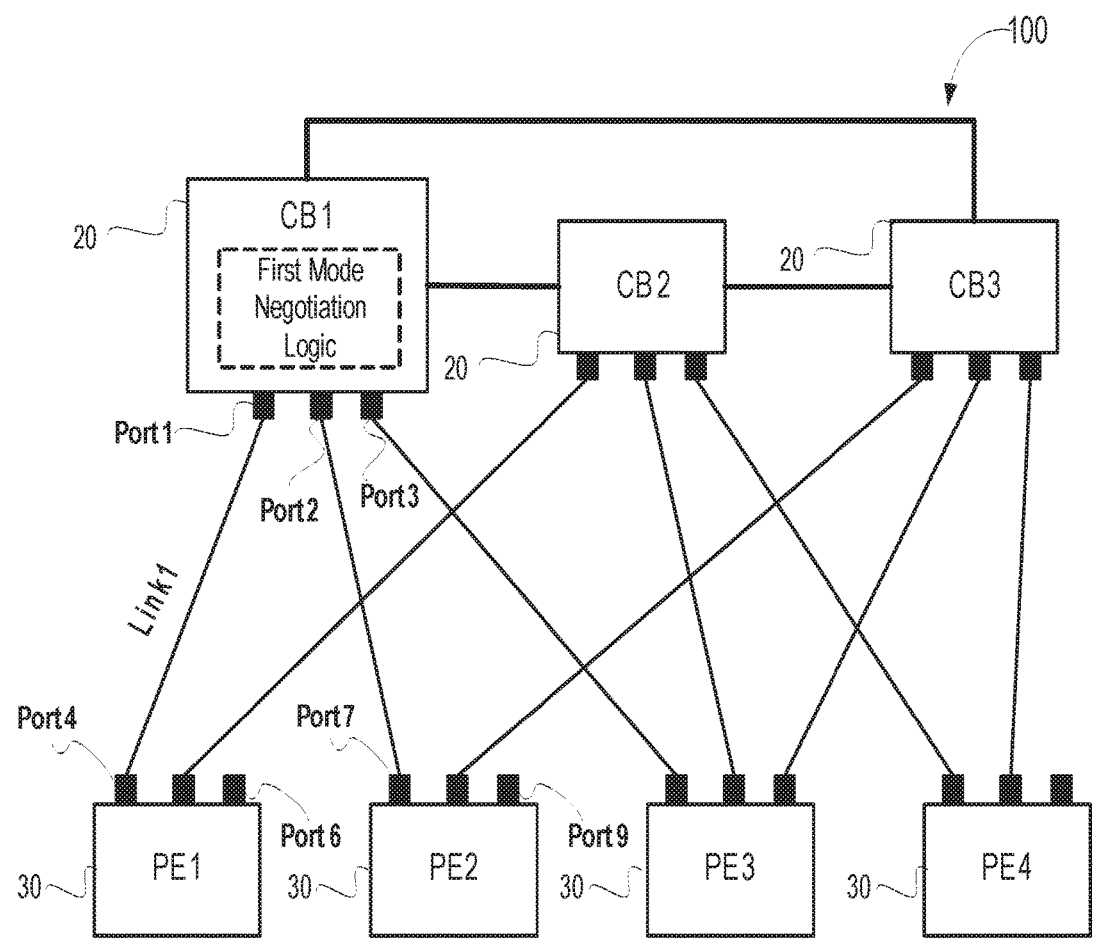
FIG. 1 is an example of a structure of a stacking system.

Refer to a stacking system 100 (also called "virtualized network device") shown in FIG. 1, the stacking system 100 includes a plurality of core backbone devices (CB) 20 (CB1, CB2 and CB3), wherein there is a stacking link connecting the core backbone devices CB1-CB3. With the virtualization technology, the CBs 20 of the stacking system 100 form a lateral virtualization stacking system in a logical view. While the illustrated example has three CBs, the number of CBs may be more or less than three in other examples. In one example the number of the CBs in the stacking system 100 can be flexibly adjusted by an administrator. In other examples the stacking system 100 does not include a lateral virtualization and there may be fewer CBs 20, such as only one CB 20.

Figure 2:
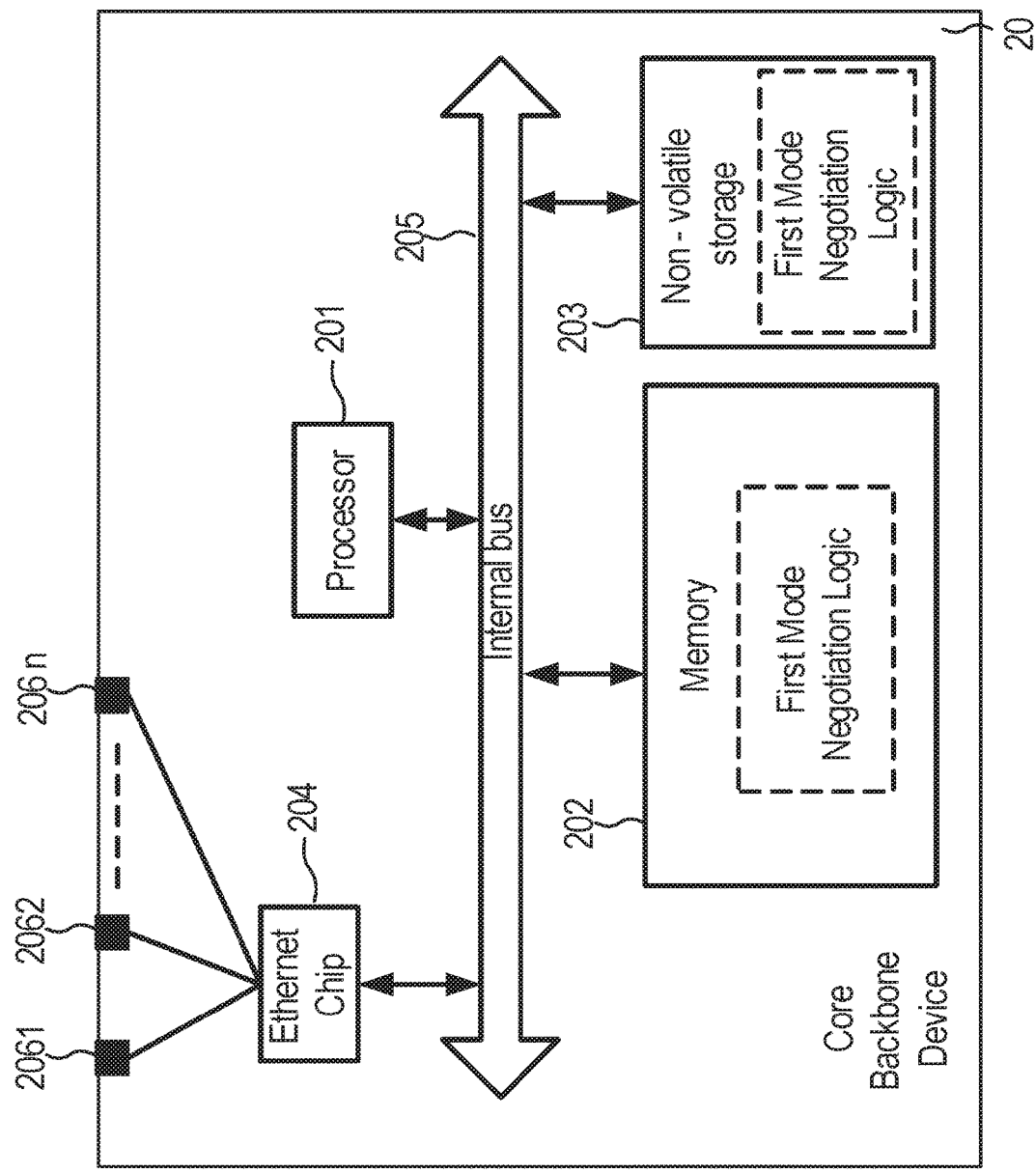
FIG. 2 is an example of a block diagram of a core backbone (CB) device.
Figure 3:
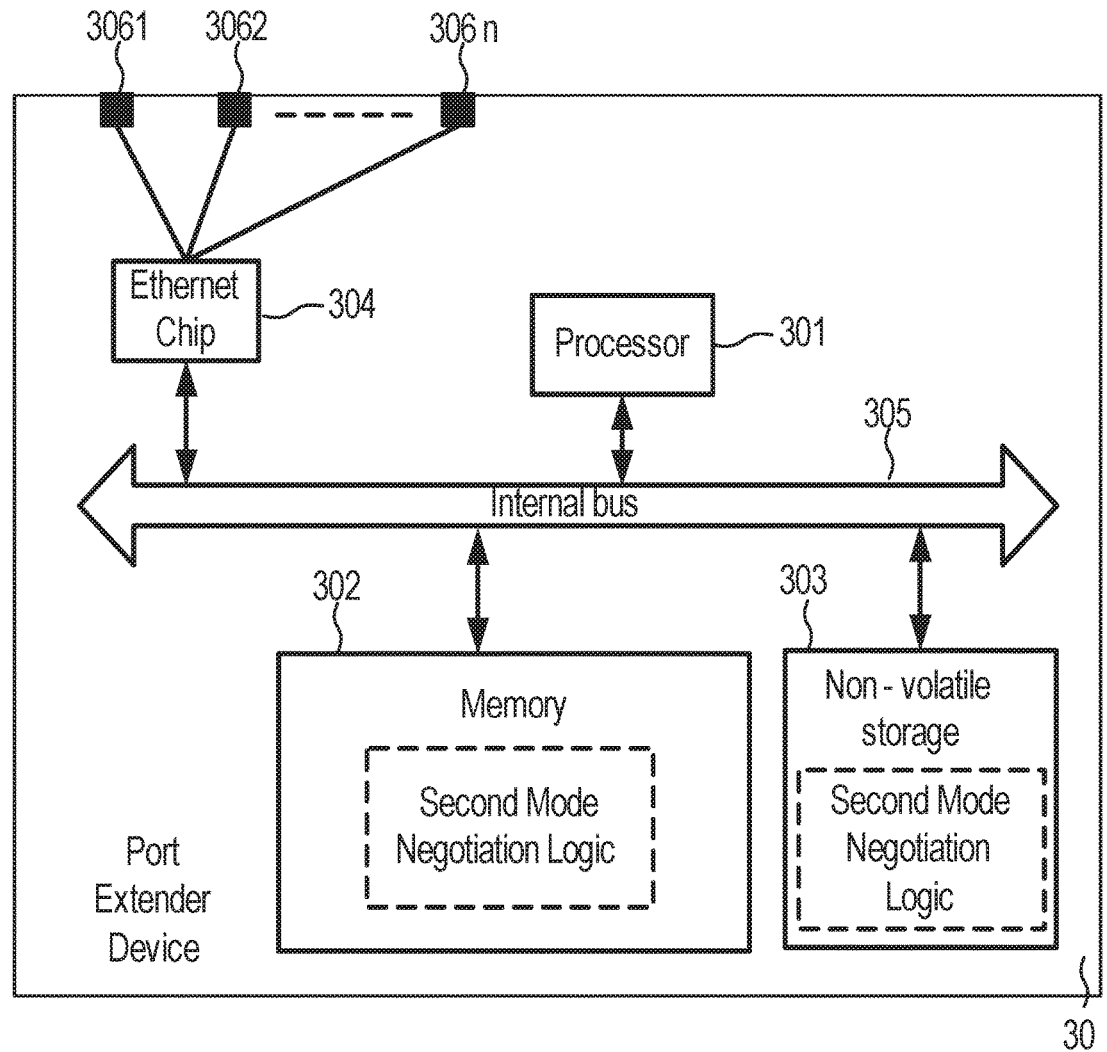
FIG. 3 is an example of a block diagram of a port extender (PE) device.

Vertical virtualisation of the stacking system 100 connects ports of the PEs to ports of the CBs, and may treat ports of the PEs as remote line cards of the CB device from a logical point of view. Refer to the example shown in FIG. 1, in the vertical virtualization of stacking system 100, three Ethernet ports of CB1 are respectively connected to an Ethernet port of the three port extender (PE) 30 (PE1, PE2 and PE3). Three Ethernet ports of CB2 are connected to an Ethernet port of PE1, PE3 and PE4, respectively. Three Ethernet ports of CB3 are respectively connected to an Ethernet port of PE2, PE3 and PE4. Refer to FIG. 2 and FIG. 3, in an example, the CB 20 of the stacking system 100 includes a processor 201, a memory 202, a non-volatile memory 203, an Ethernet chip 204, an internal bus 205, and a plurality of Ethernet ports 206 (2061, . . . , 206n) which are connected to the Ethernet chip 204. The volatile memory and the non-volatile memory are both examples of a non-transitory computer readable storage medium. Furthermore, the processor 201, the memory 202, the non-volatile memory 203, and the Ethernet chip 204 are connected to the internal bus 205. The PE device 30 of the stacking system 100 includes a processor 301, a memory 302, a non-volatile memory 303, an Ethernet chip 304, an internal bus 305, and a plurality of Ethernet ports 306 (3061 . . . 306n). The processor 301, the memory 302, the non-volatile memory 303, and the Ethernet chip 304 are also connected to the internal bus 305.

According to an example, ports of the stacking system may operate in Ethernet mode or in cascade mode. The mode in which the port is currently operating is called the work mode of the port. In Ethernet mode a port receives and forwards Ethernet packets. This may be used, for instance, when an Ethernet packet is received by a port of the stacking system and is to be forwarded to another device outside of the stacking system. Cascade mode allows an Ethernet packet received by a port of a PE of the stacking system to be forwarded to another PE belonging to the same stacking system. In order to forward an Ethernet packet from a first PE of the stacking system to a second PE of the same stacking system, the first PE may add a cascade header to the Ethernet packet to form a cascade Ethernet packet. The cascade Ethernet packet may then be forwarded to the second PE via a CB device. The second PE device may remove the cascade header from the cascade Ethernet packet before forwarding or otherwise handling the Ethernet packet. Ethernet mode and cascade mode are described in more detail below together with a negotiation process for switching between Ethernet mode and cascade mode.

Figure 4:
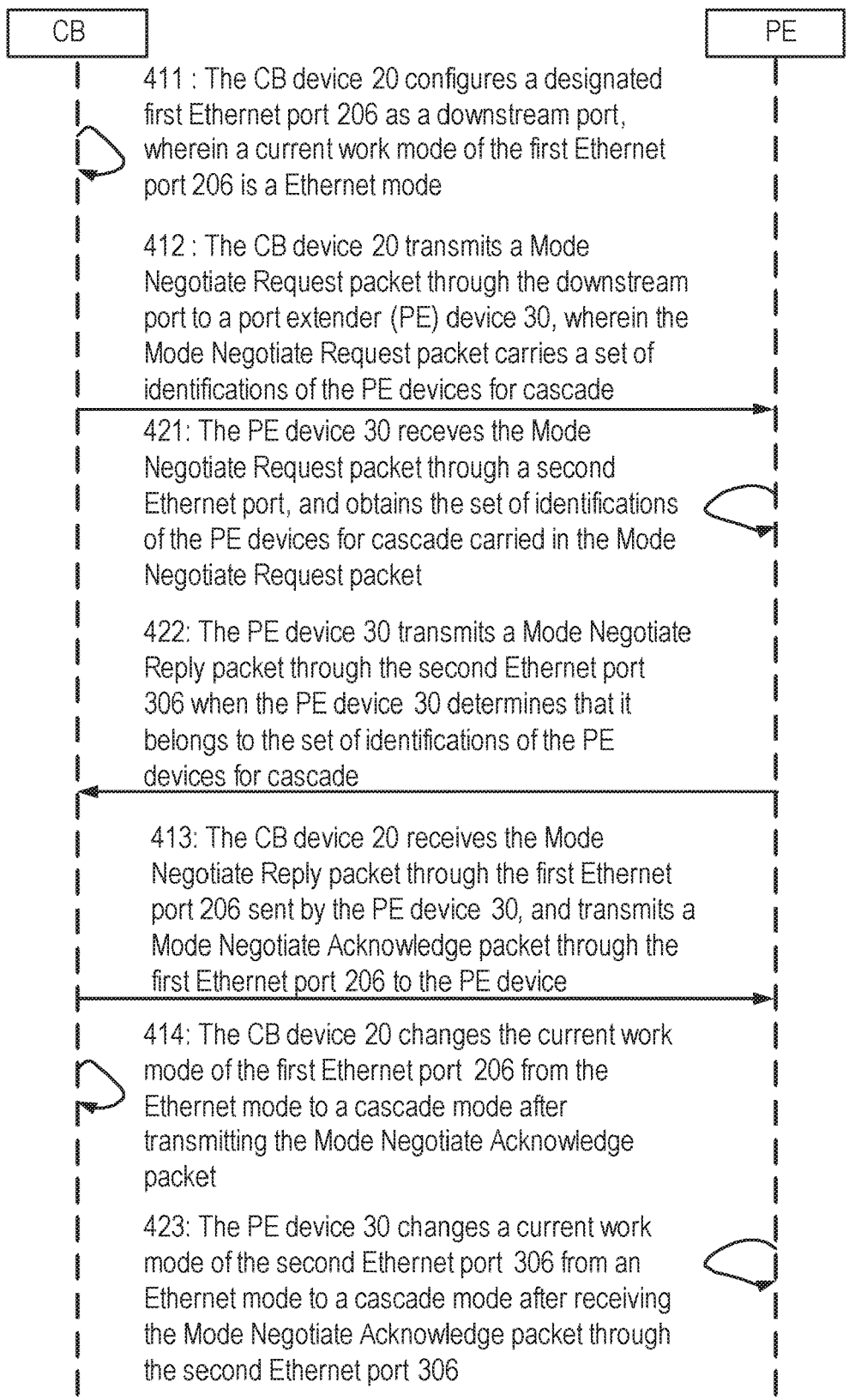
FIG. 4 is an example of a flowchart of a method of a work mode negotiation.

Please refer to FIG. 2, FIG. 3, and FIG. 4, the processor 201 of the CB device 20 of the stacking system 100 reads a first mode negotiation logic stored in the non-volatile memory 203 into the memory 202 and executes the first mode negotiation logic. The processor 301 of the PE device 30 of the stacking system 100 reads a second mode negotiation logic stored in the non-volatile memory 303 into memory 302 and executes the second mode negotiation logic. During the operation, the first mode negotiation logic and the second mode negotiation logic work together to execute the negotiation method of a work mode of the disclosure of the application.

FIG. 4 is an example of a flowchart of a method of a work mode negotiation. As shown in FIG. 4, at block 411, the CB device 20 configures a designated first Ethernet port 206 as a downstream port, wherein the present work mode of the first Ethernet port 206 is an Ethernet mode.

At block 412, the CB device 20 transmits a Mode Negotiate Request packet through the downstream port to a port extender (PE) device 30, wherein the Mode Negotiate Request packet carries a set of identifications of the PE devices 30 for cascade.

At block 421, the PE device 30 receives the Mode Negotiate Request packet through a second Ethernet port 306 sent by a core backbone (CB) device 20, and obtains the set of identifications of the PE devices 30 for cascade carried in the Mode Negotiate Request packet.

At block 422, the PE device 30 transmits a Mode Negotiate Reply packet through the second Ethernet port 306 when the PE device 30 determines that it's ID belongs to the set of identifications of the PE devices 30 for cascade.

At block 413, the CB device 20 receives the Mode Negotiate Reply packet through the first Ethernet port 206 sent by the PE device 30, and transmits a Mode Negotiate Acknowledge packet through the first Ethernet port 206 to the PE device 30.

At block 414, the CB device 20 changes the work mode of the first Ethernet port 206 from the Ethernet mode to a cascade mode after transmitting the Mode Negotiate Acknowledge packet.

At block 423, the PE device 30 changes a work mode of the second Ethernet port 306 from an Ethernet mode to a cascade mode after receiving the Mode Negotiate Acknowledge packet through the second Ethernet port 306.

Refer to FIG. 1 and FIG. 4, the following illustrates the work mode negotiation process described above by using interactive examples between CB1 and PE1. As shown in FIG. 1, the local first Ethernet port Port1 of the CB1 device 20 is physically connected to the local second Ethernet port Port4 of the PE1 device 30 by an Ethernet link Link1. In an example, in order to make the entire configuration becomes more reasonable, the administrator specifies, by the management interface, one or more Ethernet ports as downstream port of the CB1 device. The so-called downstream ports of the CB1 device 20 are the Ethernet ports that are used to connect the CB1 device 20 with the Ethernet ports of the PE1 device 30. For example, the Ethernet port Port1 is a downstream port of the CB1 device 20. Accordingly, the Ethernet port in the PE1 device for cascading with the Ethernet port of the CB1 device is called uplink port. In an example, the administrator is not necessary to assign the uplink port in the PE1 device. In the other examples, the administrator may also not specify, by the management interface, which Ethernet port as uplink port of the PE1 device. Because these other examples, it may automatically designate the Ethernet port in the PE1 device as the uplink port, when the Ethernet port in the PE1 device is connected to the Ethernet port of the CB1 device in the sequential processing.

It is worth noting that, in this example, although the Port1 of the CB1 device is the downstream port used to implement the cascade of the CB 20 device and the PE 30 device, it is not configured to be a cascade mode at the beginning. The Port1 of the CB1 device is configured to an Ethernet mode first. After waiting the PE1 device and the CB1 device which have ready to do a cascade, then the Port1 and the Port4 are configured to be the cascade mode. In an example, the control of the work mode of the Ethernet port of the CB1 device or the PE1 device may be implementation by its own processor to send a control command to the corresponding Ethernet chip. The Ethernet chip of the CB1 device 20 or the PE1 device 30 typically may connect to a plurality of Ethernet ports, the work mode of each Ethernet port may be independently set by the Ethernet chip 204, 304 according to the control command.

Figures 5, 6:
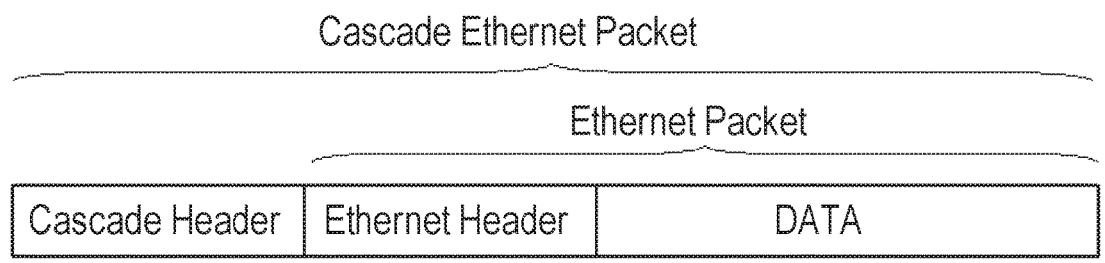
FIG. 5 is an example of a format diagram illustrating part of a cascade Ethernet packet.
FIG. 6 is an example of a format diagram illustrating part of a work mode negotiation packet.

When Port1 is operating in the Ethernet mode, the Ethernet chip of the CB1 device can receive/transmit a variety of Ethernet packets (or referred to as "Ethernet packets") complied with the IEEE802.3 standard through the Port1. When Port1 is operating in the cascade mode, the Ethernet chip of the CB1 device can receive/transmit a variety of the cascade Ethernet packets through the Port1. With reference to FIG. 5, the cascade Ethernet packet has an additional cascade head with respective to the Ethernet packet. The cascade head can carry some information to assist in data packet processing. For example, suppose the CB1 device, the PE1 device and the PE2 device can be cascaded together to form the final stacking system 100 and can be correctly work together, the cascade head will play an important role in the internal communications of the stacking system 100. Assuming the result of a forward of an Ethernet packet in the PE1 device is to be transmitted through the Port9 of the PE2 device, where the Ethernet packet is received through the Port6 of the PE1 device in the stacking system 100. At this point, the PE1 device may embed the result of the forward in the cascade header and attach the cascade header in front of the Ethernet packet to generate the corresponding cascade Ethernet packet for transmitting to the CB1 device. After receiving the corresponding cascade Ethernet packet, the CB1 device forwards it to the PE2 device. After receiving the corresponding cascade Ethernet packet, the PE2 device determines that the output port is the Port9 based on the cascade header, strips the cascade header, then transmits the Ethernet packet through the Port9.

After the state of Port1 or Port4 is changed to the UP state, its default work mode can be set to the Ethernet mode (or called normal mode). The CB1 device sends a Mode Negotiate Request packet to invite the PE device for cascade with itself. This packet contains a set of identifications of the PE devices to indicate which PE device that the CB1 device wants to invite for cascade. Assuming that the set of identifications of the PE devices includes the identification of the PE1 device, then after receiving the packet, the PE1 device can determine that it is in the invitation list and can be further communicated with the CB1 device. In an example, the PE2 and PE3 devices also execute the second mode negotiation logic, then after receiving the Mode Negotiate Request packet, the PE2 and PE3 devices can determine that they are not in the invitation list and can ignore the Mode Negotiate Request packet.

After receiving the invitation of the CB1 device, the PE1 device transmits a Mode Negotiate Reply packet to the CB1 device in response to the invitation of the CB1 device. After receiving the Mode Negotiate Reply packet, the CB1 device determines that the PE1 device accepts the invitation and may cascade with the PE1 device through the first Ethernet port Port1, and then the CB1 device transmits a Mode Negotiate Acknowledge packet to the PE1 device. The Mode Negotiate Acknowledge packet is used to trigger the state modification of the second Ethernet Port 306 by the PE1 device for entering the cascade mode. After transmitting the Mode Negotiate Acknowledge packet, the CB1 device changes the work mode of the Port1 from the Ethernet mode to the cascade mode. After receiving the Mode Negotiate Acknowledge packet, the PE1 device changes the work mode of the Port4 from the Ethernet mode to the cascade mode.

In an example, the aforementioned the Mode Negotiate Request packet, the Mode Negotiate Reply packet, and the Mode Negotiate Acknowledge packet can be self-defined in the disclosure of the application. Please refer to the example shown in FIG. 6, each mode negotiation packets to be as an Ethernet packet can include a destination MAC address (DMAC), a source MAC address (SMAC), a virtual local network area identification (VLAN), a Frame Type, and a Message Type. In an example, the DMAC may be used to specify a particular MAC address to indicate the packet is one of the mode negotiation packets. In another example, the Frame Type may be used to specify the type value, such as FFFE, to indicate the packet is one of the mode negotiation packets. The message type (Message Type) may be used to distinguish between various types of the mode negotiation packets. For example, as the Message Type is 1, it indicates that the packet is the Mode Negotiate Request packet. When the Message Type is 2, it indicates that the packet is the Mode Negotiate Reply packet. As the Message Type is 3, it indicates that the packet is the Mode Negotiate Acknowledge packet.

From the aforementioned descriptions, it is known that the work modes of the Port1 of CB1 device 20 and the Port4 of PE1 device 30 are automatically changed to cascade mode via the aforementioned process, and then the cascade process can be able to successfully complete. The automation of the negotiation process can reduce the configuration operations by the administrator for the work mode of the Ethernet ports of the CB device 20 and the PE device 30. The administrator does not need to designate which Ethernet port of the PE device 30 is an uplink port. Because the number of the PE devices 30 is typically large, it can be dramatically reduced much time of the administrator. On the other hand, the automation of the negotiation process can also avoid the problems caused by mistakes in port assignment by the administrator. For example, the administrator incorrectly connects the Port4 of the PE1 device 30 to the Ethernet ports of the CB1 device 20 in which the Ethernet ports are not the downstream ports, thus the administrator can find the error from the management interface.

Figure 7:
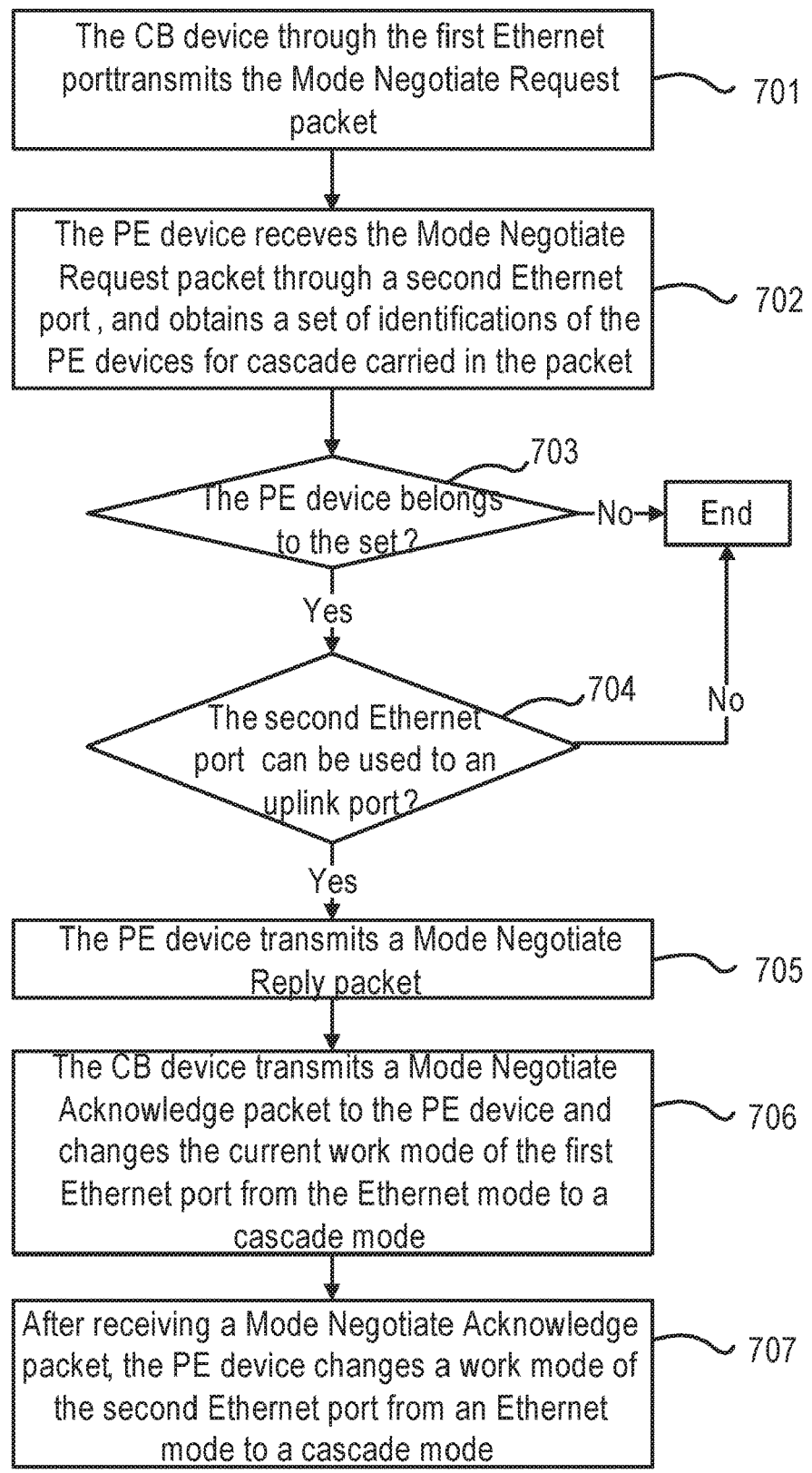
FIG. 7 is another example of a flowchart of a method of a work mode negotiation.

With reference to FIG. 1 and FIG. 7, a more detailed example is disclosed. The negotiation process of the work mode of the PE device and CB device is as follows:

Suppose a plurality of first Ethernet port 206 (e.g. Port1, Port2, Port3) of a CB1 device are designated as downstream ports, the every work mode of Port1, Port2, and Port3 is set to the Ethernet mode first.

At block 701, the CB1 device through the first Ethernet port 206 (Port1, Port2, Port3) transmits the Mode Negotiate Request packet, wherein the Mode Negotiate Request packet carries a set of identifications of the PE devices for cascade. In an example, the CB1 device may use the slot numbers of the PE1-PE3 devices as the identifications of the PE1-PE3 devices. In other example, it may also use other identification, such as the serial number of the processor of the PE device.

At block 702, the PE1 device receives the Mode Negotiate Request packet through Port4 sent by the CB1 device. The Mode Negotiate Request packet enters to an Ethernet chip through Port4, and then arrives to the processor 301. The processor 301 of the PE1 device obtains a set of identifications of the PE devices for cascade carried in the Mode Negotiate Request packet. For correctly sending the various mode negotiate packets to the processor 301, in an example, the PE1 device may send a first predetermined access control list (ACL) to the Ethernet chip 304 after Port4 is being powered up. The ACL is used to send a variety of mode negotiate request packets to the processor 301 for further being processed by the second mode negotiation logic which is running on the processor 301, that is, a variety of mode negotiate request packets are sent to the control layer for processing. The first predetermined ACL includes the common features in a variety of mode negotiate request packets, such as DMAC or Frame Type, and the corresponding operation is that a variety of mode negotiate request packets are sent to the processor for processing. In the CB1 device side, the processor 201 of the CB1 device may perform the same processing. It may send a second predetermined ACL to the Ethernet chip 204 which the first Ethernet port Port1 belongs to. The effect of the ACL is to ensure that all the packets can be sent to its own processor 201 for processing.

At block 703, the PE1 device determines whether the identifications of the PE1 device belongs to the set of identifications of the PE devices for cascade, and if the identifications of the PE1 device not belongs to the set of identifications of the PE devices, it can end the current process, otherwise, the PE1 device is allowed to be cascaded with CB1. In an example, at this point, it may turn to block 705 for processing. In another example, the processing may be transferred to block 704. According to a variety of reasons, administrators may configure a set of uplink ports of the PE1 device for cascading with the CB1 device. For example, between the CB device 20 and the PE device 30, it typically needs faster transfer speeds, and then the administrator may designate some Ethernet ports with high bandwidth as the uplink port, and prohibit some Ethernet ports with low bandwidth as the uplink port. For example, the bandwidth of Port4 of the PE1 device is 10G in which Port4 meets the requirement of the administrator. The bandwidth of Port7 of the PE2 device only has 1G, and then Port7 does not meet the needs of the administrator. The administrator may pre-deploy an allowable list or corresponding allowable rules on the PE device to indicate which Ethernet port can be configured as an uplink port. For example, on the PE device, it may deploy an allowable rule which states that the port with the bandwidth is no less than 10G can be used as uplink port. Thus, according to the allowable rule, the PE device 30 may determine whether the current Ethernet port which received the Mode Negotiate Request packet can be used to an uplink port.

At block 704, the PE device 30 further determines whether the second Ethernet port Port4 can be used to an uplink port, if not, end the current process, if yes, turn to block 705 for processing.

At block 705, the PE1 device transmits a Mode Negotiate Reply packet through the second Ethernet port Port4.

At block 706, the CB1 device receives a Mode Negotiate Reply packet through the downstream port Port1 and determines that the PE1 device can be cascaded with itself. The CB1 device transmits a Mode Negotiate Acknowledge packet through Port1 to the PE1 device. At this time, the Mode Negotiate Acknowledge packet is transmitted through Port1 whose work mode is the Ethernet mode, thus the PE1 device can still correctly process after receiving the Mode Negotiate Acknowledge packet. After transmitting the Mode Negotiate Acknowledge packet, the CB1 device changes the current work mode of Port1 from the Ethernet mode to a cascade mode. After switching to the cascade mode, the packet through Port1 is the cascade Ethernet packet shown in FIG. 5 rather the regular Ethernet packet.

At block 707, after receiving a Mode Negotiate Acknowledge packet, the PE1 device determines that the work mode of Port1 has already been changed to the cascade mode by the CB1 device, and accordingly changes a work mode of Port4 from an Ethernet mode to a cascade mode. At this time, Port4 and Port1 can send and receive the cascade Ethernet packets to each other. In another example, in the aforementioned negotiation process, after transmitting the Mode Negotiate Request packet through the downstream port Port1, if the CB1 device does not receive the Mode Negotiate Reply packet, and then the CB1 device will keep the work mode of the downstream port Port1 unchanged. The CB1 device may also have tried to transmit the Mode Negotiate Request packet through the downstream port Port1 lately.

Figure 8:
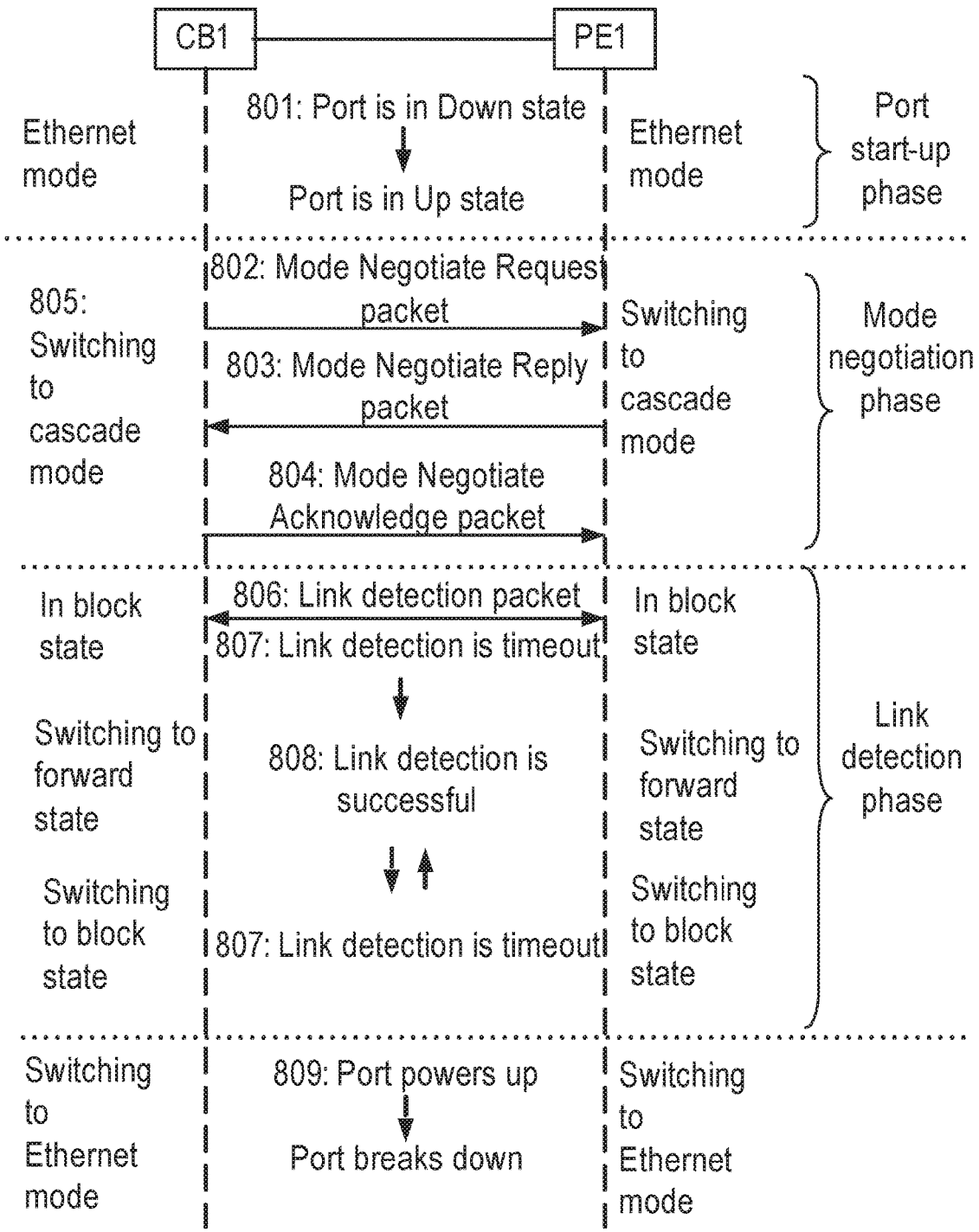
FIG. 8 is another further example of a flowchart of a method of a work mode negotiation.

With reference to FIG. 8, in another example, the negotiation process between the CB device and the PE device may include three phases which are the port (Ethernet port) start-up phase, the mode negotiation phase and the link detection phase. Block 801 to block 805 discloses the port start-up phase and the mode negotiation phase where the corresponding processes are the same with the aforementioned. At block 806, after each work mode of Port1 of CB1 device and Port4 of PE1 device is changed to the cascade mode, the CB1 device and the PE1 device may also perform the link detection for the cascade link. It may allow the exchange of data packet after determining the cascade link is in normal state by the link detection. At block 805, after setting the work mode of the second Ethernet port of PE device to the cascade mode, the PE device further sets the work status of the Ethernet port to a block state which prohibits a forward of data packet and allows a forward of link detection packet. This setting may also be implemented by issuing the second predetermined ACL. In the CB device side, the CB device can do the same processing.

Next, at block 807, the PE device may use a predetermined link detection packet to perform the link detection for the cascade link. The format of the link detection packet may reuse the format of the mode negotiation packets. For example, if the packet with Message Type is 4, it indicates that the packet is the link detection packet. Because the work modes of the first Ethernet port and the second Ethernet port are all the cascade mode, with respect to the mode negotiation packet, the link detection packet eventually need to add a cascade head. If the PE device or the CB device can successfully receive the link detection packet sent from the other, it indicates that the link detection of the cascade link is successful, and then it can perform the data packet communication. After receiving the link detection packet sent from the PE device, the CB device may set the work status of the first Ethernet port to the forward state, such as cancelling the second ACL to allow the forward of the data request. On the contrary, if the CB device does not receive the link detection packet sent from the PE device in a predetermined time, it indicates that the link detection is timeout, and then the CB device may keep the work status of the first Ethernet port in the block state. After receiving the link detection packet sent from the CB device, the PE device may set the work status of the second Ethernet port to the forward state. On the contrary, if the PE device does not receive the link detection packet sent from the CB device in a predetermined time, it indicates that the link detection is timeout, and then the PE device may keep the work status of the second Ethernet port in the block state.

In another example, after the first Ethernet port of CB device and the second Ethernet port of PE device entering the forward state in the cascade mode, at block 808, the PE device and the CB device may periodically perform the link detection for the link between Port1 and Port4. If the PE device does not receive the link detection packet sent from the CB device in a predetermined time, it indicates that the link detection is timeout, and then the work status of Port4 may re-set to the block state by the PE device. In the same way, if the CB device does not receive the link detection packet sent from the PE device in a predetermined time, then the work status of Port1 may be re-set to the block state by the CB device to prohibit the forward of data packet.

In addition, after the work mode of the second Ethernet port being set to the cascade mode by the PE device, if the second Ethernet port is detected to be broken down, such as malfunction, power down, the fiber cable or the network cable has already been pull out, the PE device needs to switch the work mode of the second Ethernet port to the Ethernet mode. At this time, because the work mode of the second Ethernet port is the Ethernet mode, it may ensure the block 421 can work smoothly when the second Ethernet port is powered up from the broken down. After the work mode of the first Ethernet port being set to cascade mode by the CB device, if the first Ethernet port is detected to be broken down, such as malfunction, power down, or the fiber cable or the network cable has already been pull out, the CB device needs to switch the work mode of the first Ethernet port to the Ethernet mode. At this time, because the work mode of the first Ethernet port is the Ethernet mode, it may ensure the block 412 can work smoothly when the first Ethernet port is powered up from the broken down.

The above are only examples of the disclosure is not intended to limit the application within the spirit and principles of the application, any changes made, equivalent replacement, or improvement in the protection of the application should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in the disclosure or the claims to a 'processor' should thus be interpreted to mean 'one or more processors'.

Further, the processes, methods and functional units described in the disclosure may be implemented in the form of a computer software product. The computer software product is stored in a storage medium and comprises a plurality of instructions for making a processor to implement the methods recited in the examples of the disclosure.

The figures are only illustrations of an example, wherein the units or procedure shown in the figures are not necessarily essential for implementing the disclosure. The units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the disclosure.

Throughout the disclosure, the word "comprise", or variations such as "comprises" or "comprising", will be understood to imply the inclusion of a stated element, integer, block, or group of elements, integers, block, but not the exclusion of any other element, integer or block, or group of elements, integers or blocks.

Numerous variations and/or modifications may be made to the above-described embodiments, without departing from the broad general scope of the disclosure. The embodiments are, therefore, to be considered in all respects as illustrative and not restrictive.

The invention claimed is:

1. A method of work mode negotiation for a core backbone (CB) device, comprising:
    configuring, by a CB device, a first Ethernet port as a downstream port, wherein a work mode of the first Ethernet port is an Ethernet mode;
    transmitting a Mode Negotiate Request packet by the CB device through the first Ethernet port to a port extender (PE) device of PE devices connected to the CB device, wherein the Mode Negotiate Request packet carries a set of identifications of the PE devices for cascade;
    receiving, by the CB device, a Mode Negotiate Reply packet through the first Ethernet port sent by the PE device, and transmitting a Mode Negotiate Acknowledge packet through the first Ethernet port to the PE device; and
    changing, by the CB device, the work mode of the first Ethernet port from the Ethernet mode to a cascade mode after transmitting the Mode Negotiate Acknowledge packet in response to an identification corresponding to the PE device belonging to the set of identifications of the PE devices connected to the CB device for cascade.

2. A method according to claim 1, further comprising:
    setting, by the CB device, a work status of the first Ethernet port to a block state after changing the work mode of the first Ethernet port to the cascade mode, wherein the first Ethernet port prohibits a forward of a data packet and allows a forward of a link detection packet as the first Ethernet port is in the block state;
    transmitting, by the CB device, the link detection packet through the first Ethernet port to the PE device; and
    setting the work status of the first Ethernet port to a forward state when the CB device receives a link detection packet through the first Ethernet port sent by the PE device.

3. A method according to claim 2, further comprising:
    periodically transmitting, by the CB device, the link detection packet through the first Ethernet port after the first Ethernet port entering the forward state; and
    changing the work status of the first Ethernet port to a block mode when the CB device does not receive the link detection packet through the first Ethernet port in a specified length of time.

4. The method according to claim 2, wherein the method includes allowing the first Ethernet port to forward the data packet and the forward of the link detection packet as the first Ethernet port in the forward state.

5. A method according to claim 1, further comprising:
    changing, by the CB device, the work mode of the first Ethernet port to the Ethernet mode when the first Ethernet port is changed from an Up state to a Down state.

6. The method according to claim 5, wherein the method includes transmitting, by the CB device, the Mode Negotiate Request packet through the first Ethernet port to the PE device when the first Ethernet port is changed from the Down state to the Up state.

7. A method according to claim 1, wherein a cascade Ethernet packet has an additional cascade head with respect to an Ethernet packet, where the cascade Ethernet packet is transmitted or received as the first Ethernet port is in the cascade mode and the Ethernet packet is transmitted or received as the first Ethernet port is in the Ethernet mode.

8. A non-transitory computer readable storage medium on which is stored machine readable instructions that when executed by a processor cause the processor to:
    set a work mode of a first Ethernet port to an Ethernet mode when the Ethernet port is designated to a downstream port;
    transmit a Mode Negotiate Request packet through the downstream port to a port extender (PE) device of PE devices, wherein the Mode Negotiate Request packet carries a set of identifications of the PE devices for cascade;
    receive a Mode Negotiate Reply packet through the first Ethernet port sent by the PE device, and transmit a Mode Negotiate Acknowledge packet through the first Ethernet port to the PE device; and
    change the work mode of the first Ethernet port from the Ethernet mode to a cascade mode after transmitting the Mode Negotiate Acknowledge packet in response to an identification corresponding to the PE device belonging to the set of identifications of the PE devices for cascade.

9. The non-transitory computer readable storage medium according to claim 8, wherein the machine readable instructions are further to cause the processor to:
    set a work status of the first Ethernet port to a block state after changing the work mode of the first Ethernet port to the cascade mode, wherein the first Ethernet port prohibits a forward of a data packet and allows a forward of a link detection packet as the first Ethernet port is in the block state;
    transmit the link detection packet through the first Ethernet port to the PE device; and
    set the work status of the first Ethernet port to a forward state as receiving the link detection packet through the first Ethernet port sent by the PE device, wherein the first Ethernet port allows the forward of the data packet and the forward of the link detection packet as the first Ethernet port is in the forward state.

10. The non-transitory computer readable storage medium according to claim 9, wherein the machine readable instructions are further to cause the processor to:
    periodically transmit the link detection packet through the first Ethernet port after the first Ethernet port entering the forward state; and
    change the work status of the first Ethernet port to a block mode as the link detection packet is not received through the first Ethernet port in a specified length of time.

11. The non-transitory computer readable storage medium according to claim 8, wherein the machine readable instructions are further to cause the processor to:
    change the work mode of the first Ethernet port to the Ethernet mode when the first Ethernet port is changed from an Up state to a Down state.

12. The non-transitory computer readable storage medium according to claim 11, wherein the machine readable instructions are further to cause the processor to transmit the Mode Negotiate request through the first Ethernet port to the PE device when the first Ethernet port is changed from the Down state to the Up state.

13. The non-transitory computer readable storage medium according to claim 8, wherein the machine readable instructions are further to cause the processor to:
   transmit or receive a cascade Ethernet packet as the first Ethernet port in the cascade mode; and
   transmit or receive an Ethernet packet as the first Ethernet port in the Ethernet mode.

14. The non-transitory computer readable storage medium according to claim 13, wherein the cascade Ethernet packet has an additional cascade head with respect to the Ethernet packet.

15. A method of a work mode negotiation for a port extender (PE) device comprising:
   receiving, by the PE device of PE devices, a Mode Negotiate Request packet through a second Ethernet port sent by a core backbone (CB) device, and obtaining a set of identifications of the PE devices for cascade carried in the Mode Negotiate Request packet;
   transmitting a Mode Negotiate Reply packet through the second Ethernet port when the PE device determines that it belongs to the set of identifications of the PE devices for cascade; and
   changing, by the PE device, a current work mode of the second Ethernet port from an Ethernet mode to a cascade mode after receiving a Mode Negotiate Acknowledge packet through the second Ethernet port in response to an identification corresponding to the PE device belonging to the set of identifications of the PE devices for cascade.

16. A method according to claim 15, further comprising:
   setting, by the PE device, a work status of the second Ethernet port to a block state after changing the current work mode of the second Ethernet port to the cascade mode, wherein the second Ethernet port prohibits a forward of a data packet and allows a forward of a link detection packet as the second Ethernet port is in the block state;
   transmitting, by the PE device, the link detection packet through the second Ethernet port to the CB device; and
   setting the work status of the second Ethernet port to a forward state when the PE device receives the link detection packet through the second Ethernet port sent by the CB device, wherein the second Ethernet port allows the forward of the data packet and the forward of the link detection packet as the second Ethernet port is in the forward state.

17. A method according to claim 16, further comprising:
   periodically transmitting, by the PE device, the link detection packet through the second Ethernet port after the second Ethernet port entering the forward state; and
   changing the work status of the second Ethernet port to a block mode when the PE device does not receive the link detection packet through the second Ethernet port in a specified length of time.

18. A method according to claim 15, further comprising:
   changing, by the PE device, the current work mode of the second Ethernet port to the Ethernet mode when the second Ethernet port is changed from an Up state to a Down state.

19. A method according to claim 15, further comprising:
   checking whether the second Ethernet port is allowed to be an uplink port after determining that the PE device belongs to the set of identifications of the PE devices for cascade before transmitting the Mode Negotiate Reply packet through the second Ethernet port.

20. A method according to claim 19, further comprising transmitting, by the PE device if the second Ethernet port is allowed to be an uplink port, the Mode Negotiate Reply packet through the second Ethernet port.

* * * * *